United States Patent [19]

Cohen et al.

[11] Patent Number: 5,418,868
[45] Date of Patent: May 23, 1995

[54] THERMALLY ACTIVATED OPTICAL SWITCH

[75] Inventors: Leonard G. Cohen, Atlanta, Ga.; Charles H. Henry, Skillman, N.J.; Rudolf F. Kazarinov, Martinsville, N.J.; Yiu-Huen Wong, Summit, N.J.

[73] Assignee: AT&T Corp., Murray Hill, N.J.

[21] Appl. No.: 153,691

[22] Filed: Nov. 17, 1993

[51] Int. Cl.⁶ .......................... G02B 6/42; G01B 9/02
[52] U.S. Cl. .................................. 385/16; 385/14; 385/15; 385/39; 385/40; 385/130; 385/131; 385/132; 356/345
[58] Field of Search ............. 385/1, 2, 4, 8, 9, 11, 385/12, 14, 15, 16, 23, 24, 27, 39, 40, 41, 42, 43, 45, 129, 130, 131, 132; 356/345, 351

[56] References Cited

U.S. PATENT DOCUMENTS

| | | | |
|---|---|---|---|
| 5,044,715 | 9/1991 | Kawachi et al. | 385/42 |
| 5,117,470 | 5/1992 | Inoue et al. | 385/14 |
| 5,125,065 | 6/1992 | Stoll et al. | 385/130 |
| 5,293,436 | 3/1994 | Diemeer | 385/14 X |

OTHER PUBLICATIONS

T. Kitoh et al., "Novel Broad-Band Optical Switch Using Silica-Based Planar Circuit," IEEE Photon. Technol. Lett. 4, pp. 735–737, Jul./(1992).

R. Adar et al., J. Lightwave Technol. Jan./(1992), pp. 46–50 "Adiabatic 3-dB Couplers, Filters, and Multiplexers Made with Silica Waveguides on Silicon."

C. H. Henry, et al., "Analysis of Mode Propagation in Optical Waveguide Devices by Fourier Expansion," IEEE J. Quantum Electron. 27 Mar./(1991), pp. 523–530.

A. Sugita et al., "Bridge-Suspended Silica-Waveguide Thermo-Optic Phase Shifter and Its Application to Mach-Zehnder Type Optical Switch," Trans. IEICE E73, Jan./(1990), pp. 105–108.

*Primary Examiner*—Brian Healy
*Attorney, Agent, or Firm*—Martin I. Finston

[57] ABSTRACT

An optically switches relatively low power requirements and a relatively broad operating bandwidth. This switch includes a Mach-Zehnder interferometer (MZI) optically coupled at respective ends to an input coupler and an output coupler. One arm of the MZI includes a thermo-optic phase shifter. The output coupler is an adiabatic 3-dB coupler. In one embodiment, the input coupler is a Y-branch coupler having one input port. In a second embodiment, the input coupler is an adiabatic 3-dB coupler having two input ports.

7 Claims, 3 Drawing Sheets

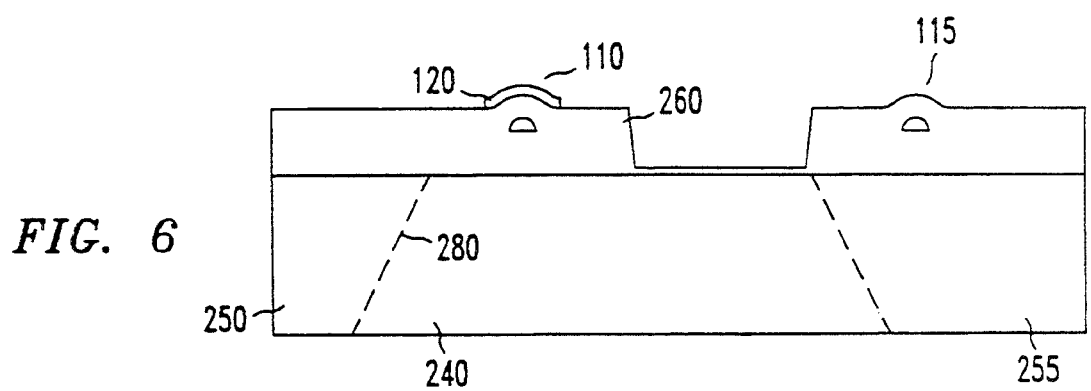
FIG. 6
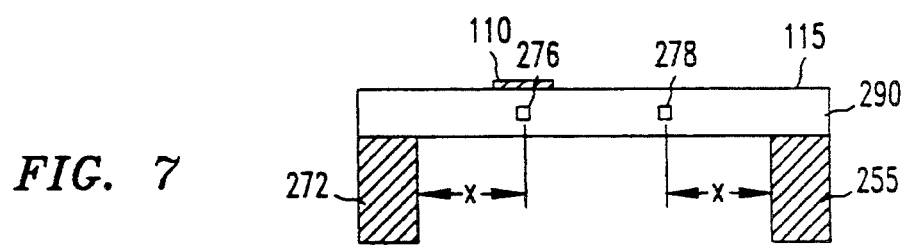
FIG. 7
FIG. 8
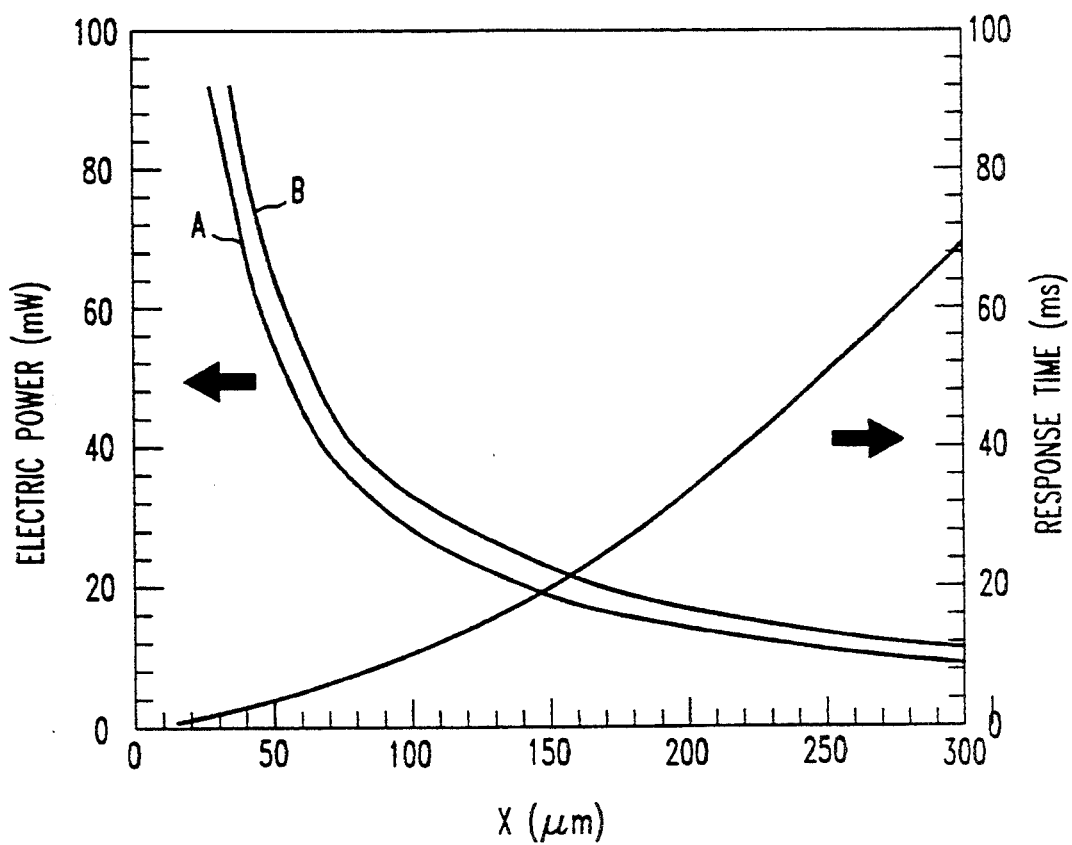

THERMALLY ACTIVATED OPTICAL SWITCH

FIELD OF THE INVENTION

This invention relates to the switching of optical signals between alternate waveguiding media such as optical fibers. More particularly, the invention relates to optical switches in which resistive heating causes a refractive index change in a portion of the switch, leading to a change in the distribution of transmitted light at the output end of the switch.

ART BACKGROUND

Switches are needed in optical communication networks, for, e.g., routing signals and adding and substituting signal-carrying lines. Integrated optical switches are advantageous for these purposes because they can be made more compact than mechanical switches, and can be embedded in integrated networks of optical interconnections.

One integrated optical switch of current interest is based on a Mach-Zehnder interferometer (MZI) that includes a thermo-optic phase shifter in one arm. Light enters the MZI through one branch of an input directional coupler, and exits the MZI through one of alternate branches of an output directional coupler. When a heating current is applied to the phase shifter, the output signal shifts from one to the other of the alternate branches. This switch has excellent transmission characteristics only when the power coupling ratios of the directional couplers are close to 3 dB. When these ratios deviate substantially from 3 dB, the output channels suffer crosstalk and excess loss. The power coupling ratio is close to 3 dB only within a relatively narrow band of wavelengths. As a consequence, effective operation of the switch is limited to a relatively narrow spectral range. For example, a typical switch designed to operate at 1.4 μm will have cross talk, in its powered state, of less than −15 dB over a range of about 1.36 μm–1.45 μm. Significantly, such a range is too small to include both the 1.3-μm and 1.55-μm communication channels.

Some practitioners have modified the MZI switch to extend its useful spectral range. For example, T. Kitoh et al., "Novel Broad-Band Optical Switch Using Silica-Based Planar Lightwave Circuit," *IEEE Photon. Technol. Lett.* 4 (1992) 735–737, reports a switch in which the directional couplers are replaced by 3-dB wavelength-insensitive couplers (WINCs). Each WINC includes an MZI having a subsidiary thermo-optic phase shifter in one arm. This switch has a predicted crosstalk of less than −20 dB over a spectral range of 1.27–1.62 μm. However, this switch requires relatively high electric power to operate the three thermo-optic phase shifters.

Thus, practitioners in the field have, until now, failed to provide an optical switch that can be operated at relatively low power over a relatively broad spectral band.

SUMMARY OF THE INVENTION

We have developed an optical switch that has relatively low power requirements and a relatively broad operating bandwidth. Our switch includes a MZI optically coupled at one end to an input coupler, and at the other end to an output coupler. The input coupler has at least one input port, and the output coupler has two output ports. One arm of the MZI includes a thermo-optic phase shifter. In contrast to MZI-based switches of the prior art, the output coupler of our switch is an adiabatic 3-dB coupler. In one embodiment, the input coupler of our switch is a Y-branch coupler having one input port. In a second embodiment, the input coupler is an adiabatic 3-dB coupler having two input ports.

BRIEF DESCRIPTION OF THE DRAWINGS

FIG. 6 is a schematic drawing of a phase-shifting segment according to the invention in one embodiment. A cavity underlying this phase-shifting segment reduces its thermal coupling to the substrate.

FIG. 7 is a schematic drawing of an alternate phase-shifting segment underlain by a cavity to reduce its thermal coupling to the substrate.

FIG. 8 is a graph representing the theoretical performance of a switch embodying the phase-shifting segment of FIG. 7. This graph shows the dependence of switch operating power and response time on the value of a geometrical parameter x, which partially describes the length of the decoupling cavity.

DETAILED DESCRIPTION

Figure 1:
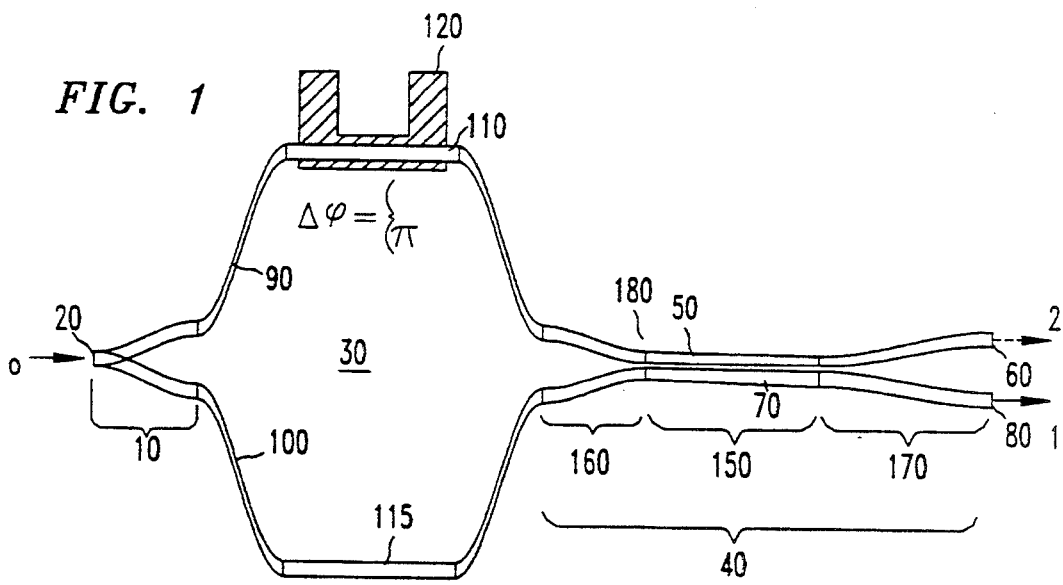
FIG. 1 is a schematic drawing of the inventive switch, in an embodiment as a 1×2 switch.

Turning now to FIG. 1, an exemplary embodiment of our switch includes Y-branch coupler 10 having input port 20, MZI 30, and adiabatic 3-dB coupler 40. As viewed in the figure, coupler 40 has an upper branch 50 with output port 60, and a lower branch 70 with output port 80. Also as viewed in the figure, MZI 30 has an upper branch 90 and a lower branch 100. Branch 90 includes a phase-shifting segment 110 that can be heating by passing an activating electric current through metal film 120. This metal film is deposited over, e.g., the upper cladding of segment 110. In operation, an input signal $P_0$ is applied to port 20. If the activating current is off, an output signal $P_1$ appears at port 80 and little or no output appears at port 60. If the activating current is on, and is adjusted to produce a phase shift of 180° in segment 110, output signal $P_2$ appears at port 60, and little or no output appears at port 80.

It should be noted that although FIG. 1 shows a phase-shifting metal film only on the upper branch, a currently preferred switch includes a dummy film on the lower branch as well. By making the upper and lower branches symmetrical in this regard, it may be possible to make the relative phase shift between the upper and lower branches even smaller when the switch is in its unpowered state.

Figure 2:
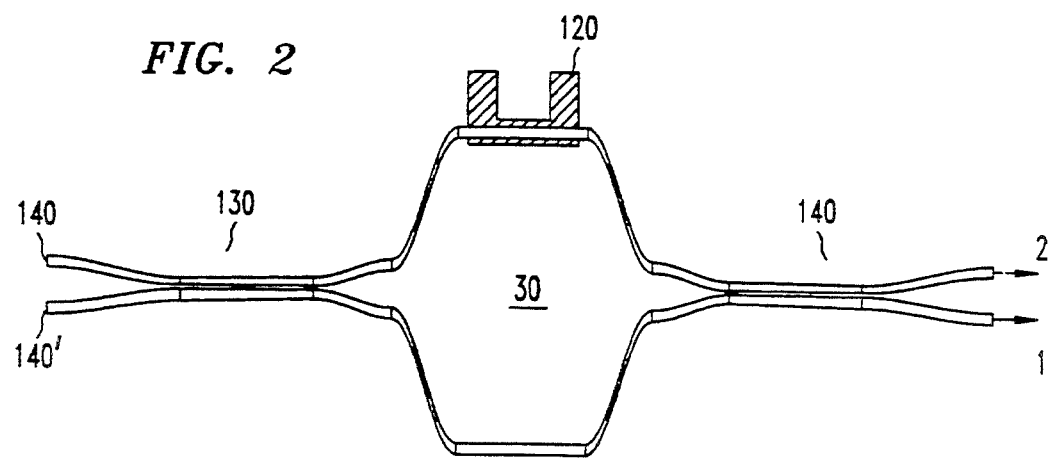
FIG. 2 is a schematic drawing of the inventive switch, in an alternate embodiment as a 2×2 switch.

Turning now to FIG. 2, the input coupler in an alternate embodiment of the inventive switch is adiabatic 3-dB coupler 130, having dual input ports 140 and 140′. (It should be noted that other input couplers, such as adiabatic Y couplers, can also be used in alternate embodiments.)

The Y-branch coupler, adiabatic 3-dB coupler, and MZI are constructed from planar waveguides. According to one well-known fabrication technique, these waveguides are formed from glass layers deposited on the surface of a silicon substrate. An exemplary fabrication sequence includes the steps of oxidizing the silicon surface to provide a lower cladding layer, depositing a core layer of phosophosilicate glass, lithographically patterning the core layer to define the waveguide configuration, and depositing an upper core layer of phosophosilicate glass. This technique is discussed generally in U.S. Pat. No. 4,902,086, issued to C. H. Henry et al. on Feb. 20, 1990. A MZI made by this technique (including symmetric input and output Y-branch couplers) is described, e.g., in R. Adar et al., *J. Lightwave Technol.* (1992) 46–50. (See especially FIG. 2 and FIG. 4 of that article.)

An optical element including a MZI optically coupled to an adiabatic 3-dB coupler has been previously described in C. H. Henry, et al., "Analysis of Mode Propagation in Optical Waveguide Devices by Fourier Expansion," *IEEE J. Quantum Electron.* 27 (1991) 523–530. The element described there is a multiplexer. That is, turning again to FIG. 1, signals in separate wavelength channels entering the element through ports 60 and 80, respectively, are combined at port 20.

The inventive switch has the different function of directing an input signal to one or the other of alternate output ports. This new function is achieved, in part, by adding phase-shifting segment 110 to the upper branch of the MZI. We have found that this switching function is effective over a relatively broad band of wavelengths. For example, a switch designed to operate at 1.42 $\mu$m will typically be effective over a range of about 1.25 $\mu$m–1.6 $\mu$m. Over this range, the switch response will typically drop by no more than about 0.2 dB from its peak value, as shown, e.g., in FIG. 3. Because the response of a correctly designed adiabatic 3 dB coupler is independent of wavelength (over typical operating ranges), this wavelength dependence is attributed to deviations of the phase shift away from 180° in the powered switch as the operating wavelength moves away from the peak wavelength.

As discussed in C. H. Henry et al., cited above, adiabatic 3-dB coupler 40 comprises a pair of waveguide branches 50, 70 that differ in width (measured in the direction parallel to the substrate surface and transverse to the propagation axis), but are otherwise equivalent. Coupler 40 includes a central portion 150 in which the separation between the branches is small enough to permit substantial optical coupling between them. (A typical separation is 2–3 $\mu$m.) The branches are flared apart in terminal portion 160, which is proximal the MZI, and in terminal portion 170, which is distal the MZI. The upper and lower branches are optionally tapered in portion 160, but in any case should be mutually symmetrical. In portion 150, the upper waveguide decreases in width in the propagation direction, and the lower waveguide increases in width (or vice versa). From different widths at the point where portion 150 meets portion 170, these waveguides taper to equal widths at the point where portion 150 meets portion 160. In portion 170, the waveguides taper from respective, relatively small and relatively large widths to, typically, standard widths at the output ports 60 and 80. (The input ports of coupler 40, where coupler 40 meets the MZI, will also typically have standard widths.)

At point 180 where terminal portion 160 joins central portion 150, the optical medium of the inventive switch supports a fundamental even mode and a first-order odd mode, and in operation, optical power will be concentrated in one or the other of these modes. Optical power admitted at input port 20 divides equally between the upper and lower arms of the MZI. If phase shifting segment 110 is not activated, these optical excitations recombine in such a way that the even mode is excited at point 180. If this occurs, then substantial output power appears only at port 80, which is associated with the wider waveguide. However, if there is a 180° phase shift in segment 110, the odd mode is excited. In this case, substantial output power appears only at port 60, which is associated with the narrower waveguide.

As noted, the input coupler of the alternate embodiment of FIG. 2 is an adiabatic 3-dB coupler having dual input ports 140 and 140'. Optical power applied to either of these input ports divides equally between the upper and lower arms of the MZI. Consequently, this embodiment functions in a manner generally analogous to the single-input embodiment of FIG. 1. With no power to the heater (and thus no phase shift), the wide input will be coupled to the wide output, and the narrow input will be coupled to the narrow output. But with power applied, the wide input will be coupled to the narrow output, and vice versa.

EXAMPLE

The performance of a single-input optical switch, substantially as described above, was predicted by computer simulations. The switch was designed for effective operation over a wavelength band including the 1.3 $\mu$m and 1.55 $\mu$m communication channels. The length of input coupler 10, measured along the general propagation axis of the switch, was 3 mm. The length of output coupler 40 was 11 mm. The length of the MZI was 9 mm, including upper parallel section 110 and lower parallel section 115, each 5 mm long. These sections were separated by 250 $\mu$m. Upper section 110 was heated by electric current passing through a resistive film such as a chromium film 3000Å thick and having a resistance of 820 $\Omega$. Power dissipation of 0.44 W produced a rise in temperature of 13° C. The refractive index of section 110 increased with temperature at at rate of $10^{-5}$/°C.

Figure 3:
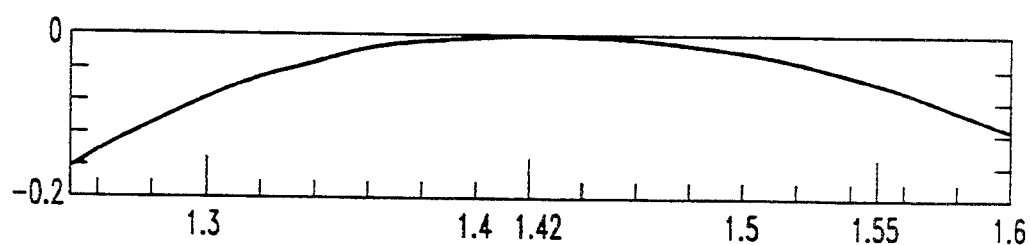
FIGS. 3 and 4 are graphs representing the spectral responses of exemplary switches according to the invention, operated in the powered state. The switch of FIG. 3 is adapted for a peak response at 1.42 μm, and the switch of FIG. 4 is adapted for a peak response at 1.40 μm.

FIG. 3 is a graph showing the performance of the exemplary switch (neglecting intrinsic losses) operating with a 180° phase shift at 1.42 $\mu$m. The output signal $P_2$ is shown as a transmission ratio in decibels. It is evident that losses due to power coupling into the undesired output arm of the switch are less than 0.1 dB over the desired operating range.

Figure 4:
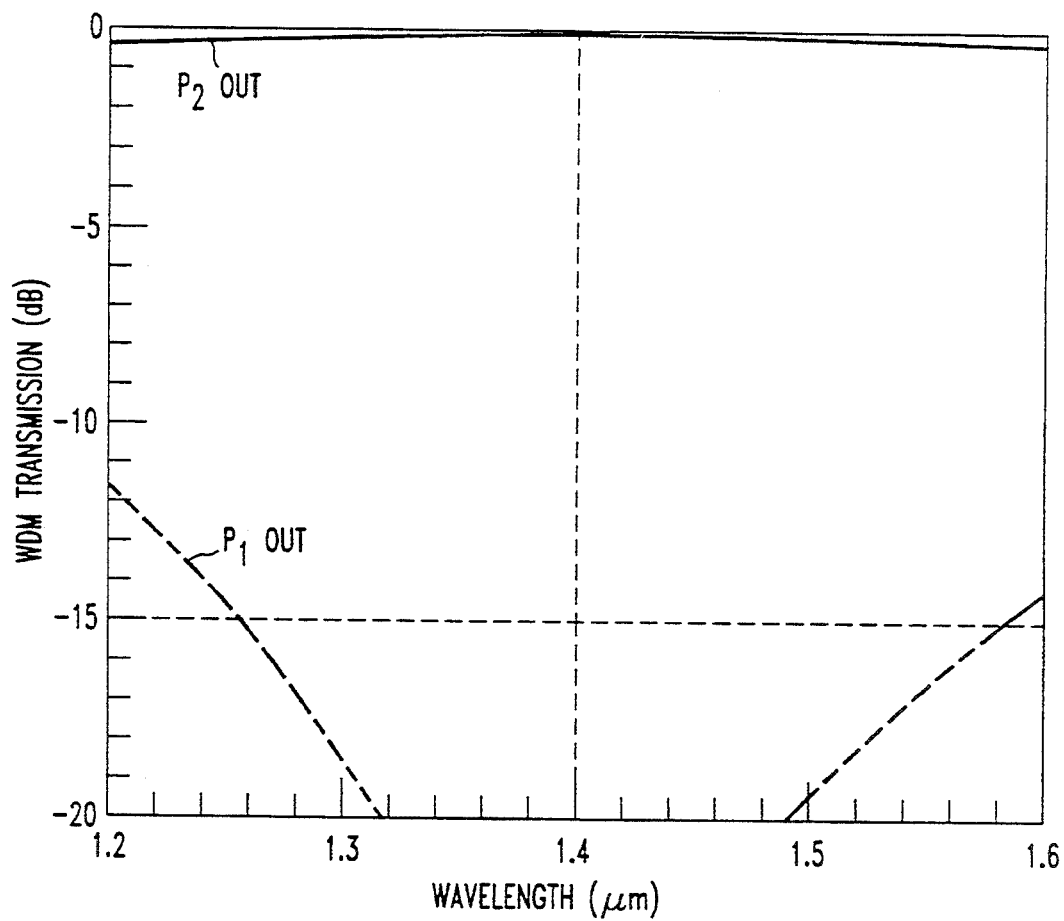

FIG. 4 is a graph showing the performance of a similar switch operating with a 180° phase shift at 1.40 $\mu$m. Both the output signal $P_2$ and the crosstalk (appearing at output P1) are shown. It is evident that crosstalk is less than $-15$ dB over a range of about 1.26 $\mu$m–1.58 $\mu$m, and over that range, the $P_2$ output falls no more than about 0.2 dB below its peak value.

The electric power requirements of the phase-shifting segment are determined, in part, by the pattern of heat flow in the switch. For example, the substrate can function as a heat sink. Thus, the power requirements tend to increase as thermal coupling to the substrate is increased.

Figure 5:
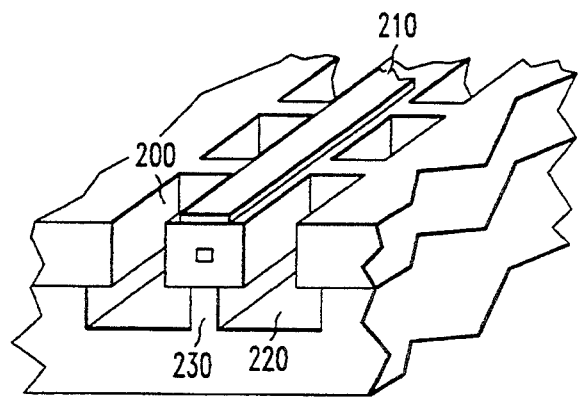
FIG. 5 is a schematic drawing of a phase-shifting segment of the prior art that is bridge suspended in order to reduce its thermal coupling to the substrate.

A phase-shifting segment with reduced thermal coupling to the substrate is described, e.g., in A. Sugita et al., "Bridge-Suspended Silica-Waveguide Thermo-Optic Phase Shifter and Its Application to Mach-Zehnder Type Optical Switch," *Trans. IEICE* E73, (1990) 105–108. As described therein, and depicted in FIG. 5, a bridge-suspended waveguide structure is formed by cutting grooves 200 adjacent the phase-shifting waveguide segment 210 that extend down to the substrate surface, and then etching recesses 220 in the substrate that partially underlie the waveguide segment. By performing this procedure on each side of the waveguide segment, the silicon base that supports the waveguide segment is reduced to a thin strip 230. This restricts thermal diffusion into the substrate, and consequently decreases power requirements.

We have developed an alternative, and currently preferred, method for reducing the power requirements of the phase-shifting segment. According to our method, which is described with reference to FIG. 6, recess 240 is formed by etching from side 250 of the substrate, opposite the MZI waveguides. Some or all of the substrate material is removed from a region that underlies segment 110 and extends more than halfway between segment 110 and segment 115. Various etching methods will be apparent to those skilled in the art. For example, well-known methods of anisotropic etching are readily employed to form a recess having perpendicular walls in a (110) silicon substrate, or a recess having inclined walls (as shown in the figure) in a (100) silicon substrate. Alternatively, well-known isotropic etching methods are readily employed to form a recess having curved, concave walls in, e.g., a silicon or glass substrate.

We have found that we can reduce the power requirements still further by removing at least some of cladding material 260 that lies between segments 110 and 115. However, it may be advantageous to leave a thin membrane 270 of cladding material, overlying recess 240, to effect a small thermal coupling between segments 110 and 115. That is, the MZI requires a finite equilibration time for the upper and lower branches to reach equal temperatures after the activating current is shut off. This equilibration time tends to increase as thermal coupling between upper parallel section 110 and lower parallel section 115 is decreased. Simple one-dimensional heat-transfer modeling has shown that in at least some cases, membrane 270 can limit the equilibration time without substantially increasing the electric power requirements. Such a membrane is readily made, for example, by etching of a silica cladding layer.

It should be noted in this regard that it may be advantageous to situate recess 240 symmetrically with respect to segments 110 and 115 in order to minimize passive optical phase shifts between these segments.

By way of example, we have performed a computer simulation of the thermal behavior of a MZI partially underlain by a recess formed in a Si (110) substrate, as shown in FIG. 7. In our model, the recess had perpendicular walls extended continuously under both sections 110 and 115, and extended a further distance x beyond each of these sections. The cores of segments 110 and 115 were embedded in a silica cladding layer 260 that was uniformly 30 $\mu$m thick and were separated by 200 $\mu$m. The heating film 120 was a strip 30 $\mu$m wide centered over the core of segment 110. We found that at x=100 $\mu$m, the switch could theoretically operate in the 1.3–1.55 $\mu$m range at a power as low as about 30 mW with an equilibration time of about 10 ms.

FIG. 8 is a graph showing the dependence of operating power and response time on the value of the parameter x in our computational model.

We claim:

1. An optical switch comprising an input coupler, an output coupler, and a Mach-Zehnder interferometer, hereafter denoted an "MZI," optically coupled to the input and output couplers, wherein:
   a) the input coupler has at least one port for inputting electromagnetic radiation, hereafter denoted "radiation," to the switch;
   b) the output coupler has two ports for outputting radiation from the switch;
   c) the MZI has first and second arms; and
   d) the switch includes means for causing at least some wavelengths of radiation traversing the first arm to undergo a phase shift of about 180° relative to radiation traversing the second arm, leading to switching of output radiation from one to the other of the output ports when the phase-shift means are activated,

CHARACTERIZED IN THAT e) the output coupler is an adiabatic 3-dB coupler; and
   f) the phase-shift means, MZI, and output coupler are adapted such that in operation, the transmission of the optical switch through the currently designated active output port will vary by no more than 0.2 dB over a wavelength band at least 0.25 $\mu$m wide, irrespective of which of the two output ports is currently designated.

2. Apparatus of claim 1, wherein the input coupler is a Y-branch coupler having one input port.

3. Apparatus of claim 1, wherein the input coupler is an adiabatic 3-dB coupler having two input ports.

4. An optical switch comprising an input coupler, an output coupler, and a Mach-Zehnder interferometer, hereafter denoted an "MZI," optically coupled to the input and output couplers, wherein:
   a) the input coupler has at least one port for inputting electromagnetic radiation to the switch;
   b) the output coupler has two ports for outputting electromagnetic radiation from the switch;
   c) the MZI has first and second arms; and
   d) the switch includes means for causing at least some wavelengths of radiation traversing the first arm to undergo a phase shift of about 180° relative to radiation traversing the second arm, leading to switching of output radiation from one to the other of the output ports when the phase-shift means are activated,

CHARACTERIZED IN THAT e) the switch comprises precisely one MZI;
   f) the switch comprises precisely one electrical resistance heater, said heater included in the phase-shift means;
   g) the phase-shift means are adapted to provide a 180° phase shift when powered by no more than about 0.5 W; and
   h) the phase shift means and output coupler are adapted such that activation of the phase shift means causes output radiation within a wavelength band at least 0.25 $\mu$m wide to be switched between the output ports with less than $-15$ dB of crosstalk between the two output ports.

5. Apparatus of claim 1, wherein:
   a) each arm of the MZI comprises a planar optical waveguide formed on a principal surface of a silicon substrate;

b) the phase-shift means comprise an electrical resistance heater overlying at least a portion of the first arm of the MZI; and c) an opening is defined in the silicon substrate such that the portion of the first MZI arm overlain by the heater is unsupported by underlying silicon substrate material.

6. Apparatus of claim 5, wherein the opening has a length and width adapted such that a 180° phase shift is provided when the phase shift means are powered by no more than about 30 mW.

7. An optical switch comprising an input coupler, an output coupler, and a Mach-Zehnder interferometer, hereafter denoted an "MZI" optically coupled to the input and output couplers, wherein:

a) the input coupler has at least one port for inputting electromagnetic radiation, hereafter denoted "radiation," to the switch;

b) the output coupler is an adiabatic 3-dB coupler having two ports for outputting radiation from the switch;

c) the MZI has first and second arms, each said arm comprising a planar optical waveguide formed on a principal surface of a silicon substrate and embedded in a silica-containing layer overlying said surface; and d) the switch includes means for causing at least some wavelengths of radiation traversing the first arm to undergo a phase shift of about 180° relative to radiation traversing the second arm, leading to switching of output radiation from one to the other of the output ports when the phase-shift means are activated, said phase-shift means comprising an electrical resistance heater overlying at least a portion of the first arm of the MZI; wherein:

e) a groove, parallel to the MZI arms, is defined in a portion of the silica-containing layer intermediate the MZI arms, such that the thickness of the silica-containing layer in the area of the groove is less than the thickness of said layer in the area of the MZI arms; and f) an opening is defined in the silicon substrate such that the portion of the first MZI arm overlain by the heater is unsupported by underlying silicon substrate material, and said opening extends beneath the groove such that the silica-containing layer in the area of the groove is unsupported by underlying silicon substrate material.

* * * * *